United States Patent
van Schaik (10) Patent No.: US 10,346,294 B2
(45) Date of Patent: Jul. 9, 2019

(54) COMPARING SOFTWARE PROJECTS HAVING BEEN ANALYZED USING DIFFERENT CRITERIA

(71) Applicant: SEMMLE LIMITED, Oxford (GB)

(72) Inventor: Sebastiaan Johannes van Schaik, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/485,034

(22) Filed: Apr. 11, 2017

(65) Prior Publication Data

US 2018/0293160 A1 Oct. 11, 2018

(51) Int. Cl.
G06F 11/36 (2006.01)

(52) U.S. Cl.
CPC .................. G06F 11/3692 (2013.01)

(58) Field of Classification Search
None
See application file for complete search history.

(56) References Cited

U.S. PATENT DOCUMENTS

| | | | | |
|---|---|---|---|---|
| 7,840,944 B2 * | 11/2010 | Brunswig | ........... | G06F 11/3688 714/38.1 |
| 8,087,001 B2 * | 12/2011 | Hoyek | ................. | G06F 11/3688 717/124 |
| 8,195,983 B2 * | 6/2012 | Celeskey | .............. | G06F 11/008 714/37 |
| 8,336,030 B1 * | 12/2012 | Boissy | ........................ | G06F 8/71 717/122 |
| 8,607,198 B2 * | 12/2013 | Nir-Buchbinder | .......................... | G06F 11/3616 717/124 |
| 9,600,395 B2 | 3/2017 | Salecker et al. | | |
| 2006/0168565 A1 * | 7/2006 | Gamma | .............. | G06F 11/3688 717/122 |
| 2007/0089092 A1 * | 4/2007 | Schmidt | .................... | G06F 8/10 717/126 |
| 2008/0104096 A1 * | 5/2008 | Doval | ........................ | G06F 8/10 717/126 |
| 2008/0270992 A1 * | 10/2008 | Georgieva | ................. | G06F 8/60 717/127 |
| 2010/0199263 A1 * | 8/2010 | Clee | ......................... | G06F 8/71 717/125 |
| 2011/0055798 A1 * | 3/2011 | Kraft | .................... | G06F 11/3604 717/100 |
| 2015/0026664 A1 * | 1/2015 | Bartley | ............... | G06F 11/3676 717/124 |

(Continued)

Primary Examiner — Isaac T Tecklu
(74) Attorney, Agent, or Firm — Fish & Richardson P.C.

(57) ABSTRACT

Methods, systems, and apparatus, including computer programs encoded on computer storage media, for comparing software projects having been analyzed using different criteria. One of the methods includes receiving, for each of a plurality of software projects, source code evaluation criteria that had been used to analyze source code of the respective software project. An overlapping set of source code evaluation criteria is determined. For each of the software projects, source code analysis results which resulted from the overlapping set of source code evaluation criteria are determined, and a respective value of a characteristic metric for the source code analysis results is computed. The respective values of the characteristic metric for each of the software projects are compared, and for at least one of the software projects, an assessment of the software project is output.

20 Claims, 4 Drawing Sheets (56) References Cited

U.S. PATENT DOCUMENTS

2015/0309790 A1* 10/2015 Henriksen ......... G06F 17/30106
717/121
2016/0041824 A1* 2/2016 Bostick .................... G06F 8/72
717/123
2016/0162388 A1* 6/2016 Henriksen ........... G06F 11/3604
717/124

* cited by examiner

COMPARING SOFTWARE PROJECTS HAVING BEEN ANALYZED USING DIFFERENT CRITERIA

BACKGROUND

This specification relates to static analysis of computer software source code.

Static analysis refers to techniques for analyzing computer software source code without executing the source code as a computer software program. Static analysis may rely on one or more characteristic metrics associated with software development projects. Using characteristics metrics, static analysis systems attempt to determine accurate and reliable conclusions about various properties of software development projects. Such conclusions may be used for a variety of purposes, including software performance optimization, software debugging, and software development cost estimation.

Static analysis can be performed on a code base, which is a collection of source code files that is typically maintained by a version control system. Version control systems generally maintain multiple revisions of the source code in the code base, each revision being referred to as a snapshot. Each snapshot is a view of the source code of files of the code base as the files existed at a particular point in time. Snapshots stored in a version control system can be represented as a directed, acyclical revision graph. Each node in the revision graph represents a commit of the source code. A commit represents a snapshot as well as other pertinent information about the snapshot such as the author of the snapshot, and data about ancestor commits of the node in the revision graph.

In this specification, the term "software project," or for brevity, a "project," is a collection of source code files organized in a particular way, e.g., in a hierarchical directory structure, with each source code file in the project having a respective path. Each project has one or more respective owners. Typically, the source code files in a project provide one or more related functionalities.

Characteristic metrics associated with a software development project may be derived from the computer software code associated with a software development project, from the information associated with the development of the project maintained by a project development environment, from specification documents associated with the software development project, and from external information associated with third-party interactions with the software development project.

SUMMARY

This specification describes how a system can equitably compare software projects that have been analyzed at different times using different source code evaluation criteria. A software project can be analyzed using evaluation criteria that are available at a time the project is analyzed, and a resulting metric can be determined for the software project. Criteria used to analyze software projects can change over time as additional criteria are added and/or removed, potentially leading to inequitable comparisons between projects that were analyzed at different times. Instead of comparing software projects based solely on the metric that resulted for each project at the time the project was analyzed, additional metrics can be determined when a group of software project are compared. To generate additional metrics, the analysis results for each software project can be stored in association with the evaluation criteria used to generate the results, and an additional metric can be generated based on a common set of criteria that had been used to analyze all the software projects being compared. The software projects can be assessed, e.g., ranked and rated, in order to identify projects which can benefit from additional review, thus improving software under development.

Particular embodiments of the subject matter described in this specification can be implemented so as to realize one or more of the following advantages. Software projects can be equitably compared, even though the projects had been analyzed at different times using different evaluation criteria, and have possibly been developed by different entities (e.g., development firms). Such a comparison can be performed using previously generated and stored analysis data, thus making it possible to equitably compare software projects without incurring the costs of reanalyzing source code of each of the projects, saving time and processing resources. Software developers can use software project assessments to identify software projects to focus on, to identify particular areas for improvement, and to determine whether a software project is ready for release. Thus, the quality of software under development can be improved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for analyzing, comparing, and assessing multiple different software projects. Source code developers can produce source code of a software project using various coding tools. A static analysis system can perform static analysis on the source code based on various source code evaluation criteria to identify characteristic segments of the source code. A static analysis system can then generate corresponding source code analysis results. The source code analysis results can identify each characteristic segment of source code along with other information, e.g., a location in the source code base and a description of the problem.

The types of characteristic segments of source code can include, among other things, coding defects in the source code. Coding defects can be represented by data elements that will be referred to as violations. The types of coding defects that a static analysis system can identify include correctness standards on coding concurrent processes, maintainability standards on eliminating duplicate code segments, readability standards on reducing code complexity, and framework standards on using code libraries, to name just a few examples.

A static analysis system can also attribute violation status changes to various authors. Violation status changes include violations introduced into a project and violations removed from the project. Suitable techniques for attributing violation status changes to responsible entities are described in more detail in commonly-owned U.S. patent application Ser. No. 14/696,185, entitled "Source Code Violation Matching and Attribution," which is incorporated herein by reference.

Source code developers can use the analysis results to guide how to improve the source code in the software project. Additionally, analysis results of multiple software projects can be compared to identify projects which could particularly benefit from additional review and development. As another example, analysis results of multiple versions of a software project can be compared to determine whether the quality of the project is improving or regressing. However, source code evaluation criteria used to analyze software projects can change as criteria are added and/or removed over time. For example, if a software project's source code had been analyzed a year ago with a set of one hundred different evaluation criteria, and the same source code were to be analyzed today with a set of one hundred at fifty different evaluation criteria, e.g., the original hundred criteria and an additional fifty criteria added over the year, problems in the source code may be identified today that were not identified a year ago, even though the source code is the same.

Similarly, if overall analysis results for two different software projects were to be compared, with one project having been analyzed a year ago using the set of one hundred evaluation criteria, and the other project having been analyzed today using the set of one hundred and fifty evaluation criteria, a direct comparison of the projects based on the analysis results would not be equitable. In general, static analysis is a computationally expensive process. To solve the technical problem of comparing software projects that have undergone source code analysis at different times using different criteria, without reanalyzing all of the source code of all of the software projects, a set of overlapping criteria that had been used to analyze all of the software projects being compared is determined, and the software projects are compared on the basis of previously generated and stored source code analysis results that pertain only those criteria.

Figure 1:
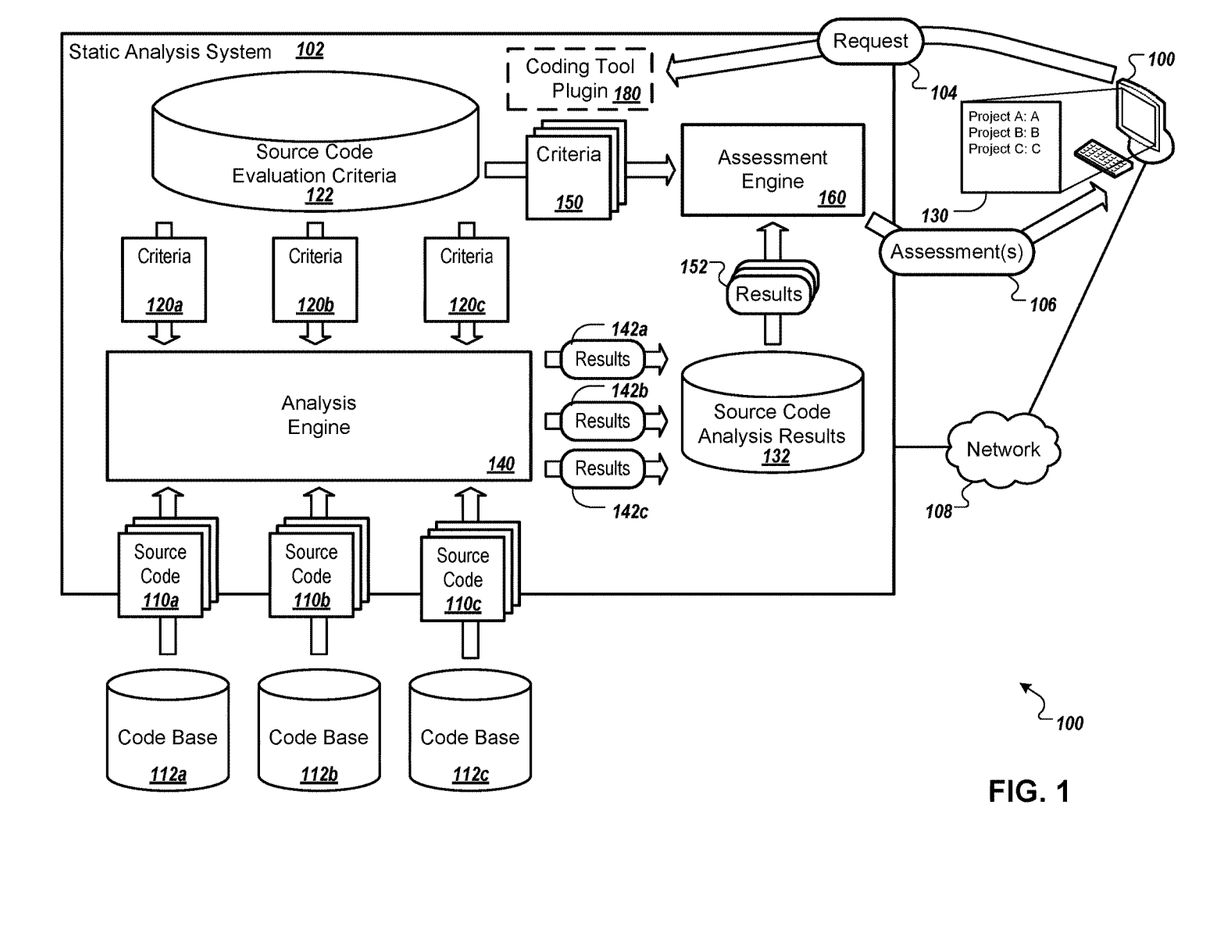
FIG. 1 illustrates an example system.

FIG. 1 illustrates an example system. A user device 100 can provide, to a static analysis system 102, a request 104 for one or more software project assessments 106. The static analysis system 102, or portions of the static analysis system, can be installed on the user device 100, for example, or can be installed on a distributed computing system having multiple computers in communication with the user device 100 over a communication network 108.

The static analysis system 102 is an example of a static analysis system that can be implemented in a distributed, cloud-based environment for performing distributed analysis for a single project or for multiple projects. In general, the request 104 may pertain to a user request for a comparative assessment, e.g. rankings, ratings, or both for one or more software projects, each software project including source code, e.g., files, classes, and/or functions, maintained in a code base. For example, the static analysis system 102 can analyze source code 110a received from a code base 112a, source code 110b received from a code base 112b, and source code 110c received from a code base 112c. An analysis of source code can be performed based on criteria that are available at a time at which analysis occurs. Analysis of source code of different software projects, for example, can occur days, weeks, months, or even years apart. For example, the static analysis system 102 can include and/or communicate with a source code evaluation criteria data source 122 that provides a set of criteria 120a when analyzing the source code 110a, a possibly different set of criteria 120b when analyzing the source code 110b, and a possibly different set of criteria 120c when analyzing the source code 110c. Two or more sets of criteria 120a-c can be the same set of criteria, for example, when criteria that are used for analyzing source code has not changed between occurrences of analyzing different sets of source code. Based on the analysis, the static analysis system 102 can perform a comparative assessment of different software projects that have had source code analysis performed at different times, using different sets (and/or same sets) of criteria. For example, the system 102 can include a ranking and/or rating of one or more software projects in the software project assessment(s) 106, including information based on an analysis of source code received from one or more of the respective code bases 112a-c. In response to receiving the software project assessment(s) 106, for example, the user device 100 can update an interface 130 presented by a device display to include the rankings and/or ratings included in the assessment(s) 106, e.g., as a ranked list of software projects and/or as one or more rated software projects.

The static analysis system 102 can include several different functional components, including an analysis engine 140, and an assessment engine 160. The various functional components of the static analysis system 102 may be installed on one or more computers as separate functional components or as different modules of a same functional component. For example, the components 140 and 160 of the static analysis system 102 can be implemented as computer programs installed on one or more computers in one or more locations that are coupled to each through a network. In cloud-based systems for example, these components can be implemented by individual computing nodes of a distributed computing system.

In general, each of the code bases 112a, 112b, and 112c can include a collection of all source code files used to build a particular respective software system, application, or component. Each of the code bases 112a, 112b, and 112c can be stored in a source control repository included in a revision control system, for example, and/or can be stored as a set of files.

The analysis engine 140 can receive the source code 110a, 110b, and 110c from the respective code bases 112a, 112b, and 112c, can perform a source code analysis on the received source code based on the respective sets of source code evaluation criteria 120a, 120b, and 120c, and can generate respective source code analysis results 142a, 142b, and 142c. The analysis engine 140 can use any appropriate techniques for analyzing the source code to identify characteristic segments of source code that satisfy the evaluation criteria. For example, the evaluation criteria can be embodied as a number of rules that are evaluated on different segments of the source code. As another example, a static analysis system can parse the source code in a project to populate a database that stores properties of the source code elements in the project. The static analysis system can then query the database with queries in an appropriate query language, e.g., SQL or Datalog, using queries that each embody one or more of the various evaluation criteria. For some projects, the analysis engine 140 can extract source code of the project by building the source code of the project and intercepting any resulting compilers called during the build process. Regardless of how the analysis is performed, the process of analyzing real-world projects is generally a very time consuming process, and analyzing all of the thousands of projects that can be stored in the system on a regular basis is generally impracticable or impossible.

The source code analysis results 142a, 142b, and 142c, for example, can be maintained as source code analysis results data 132, e.g., in a repository and/or in memory. The data 132 can include, for each software project that has undergone source code analysis, information that specifies values for one or more characteristic metrics for the project.

The assessment engine 160 can receive source code analysis results 152 for multiple prior source code analysis events (e.g., the source code analysis results 142a, 142b, and 142c), and can receive source code evaluation criteria 150 used during the prior source code analysis events (e.g., the source code evaluation criteria 120a, 120b, and 120c), and can perform a comparative assessment of each of the corresponding source code projects, even though the source code of the software projects may have been analyzed at different times, using different criteria.

As part of the comparative assessment, the assessment engine 160 can compute respective values for one or more characteristic metrics for each of the software projects. In general, a characteristic metric quantifies the quality of a software project according to the characteristic segments of source code identified in the project. Example characteristic metrics include a total number of violations, a total number of violations introduced over a particular time period, a net number of violations introduced over a particular time period, and a violation density, to name just a few examples. A net number of violations introduced can be computed as a total number of violations introduced minus a total number of violations removed. The violation density compares the frequency of violations to the size of the project. For example, the violation density can be computed as a total number of violations divided by a number of lines of code of the project. In some implementations, violations may be weighted, such that different violations are associated with different weight values. A weighted characteristic metric, for example, can factor in the weight values with the number of violations when computing a value for the characteristic metric.

A ranked list of software projects and/or a rating for one or more software projects, for example, can be provided within the software project assessment(s) 106. Techniques for assessing, e.g., comparing, ranking, and rating, software projects will be discussed in more detail below.

The static analysis system 102 can include a coding tool plugin 180. The coding tool plugin 180 is a software application or module that extends the capabilities of other coding tools by allowing the software project assessment(s) 106 generated by the static analysis system 102 to be integrated into the other coding tools. The implementation of the coding tool plugin 180 will depend on the particular coding tool being extended. For simplicity, only one coding tool plugin 180 is shown. However, the system 102 may include multiple coding tool plugins to support a variety of applications. The static analysis system 102, for example, can receive requests for software project assessments, e.g., the request 104, and can provide relevant information, e.g., the assessment(s) 106, through the coding tool plugin 180.

An example of a coding tool that can make use of the coding tool plugin 180 is an integrated development environment (IDE). An IDE is an application, or a suite of applications, that facilitates developing source code on a single user device through a graphical user interface. An IDE usually has applications including a source code editor, a compiler, and a debugger. IDEs often also have a file browser as well as object and class browsers. IDEs are designed to be interactive and responsive. Thus, performing a full analysis of all source code files in the code bases 112a-c is generally too time consuming for IDE applications. An IDE can use the coding tool plugin 180 to receive comparative assessment information (e.g., the assessment(s) 106) for one or more previously analyzed software projects, and to present relevant information within the development environment. For example, a user can request software project assessment(s) 106 by selecting an option, e.g., a button, from within the IDE. The coding tool plugin 180 can then identify relevant information, and can display the assessment(s) 106 within the IDE.

The aforementioned coding tool illustrates a common situation where providing software project information is beneficial. In addition, other appropriate coding tools can also use a corresponding coding tool plugin 180 to integrate the software project assessment(s) 106 generated by the static analysis system 102 for a particular application.

Figure 2:
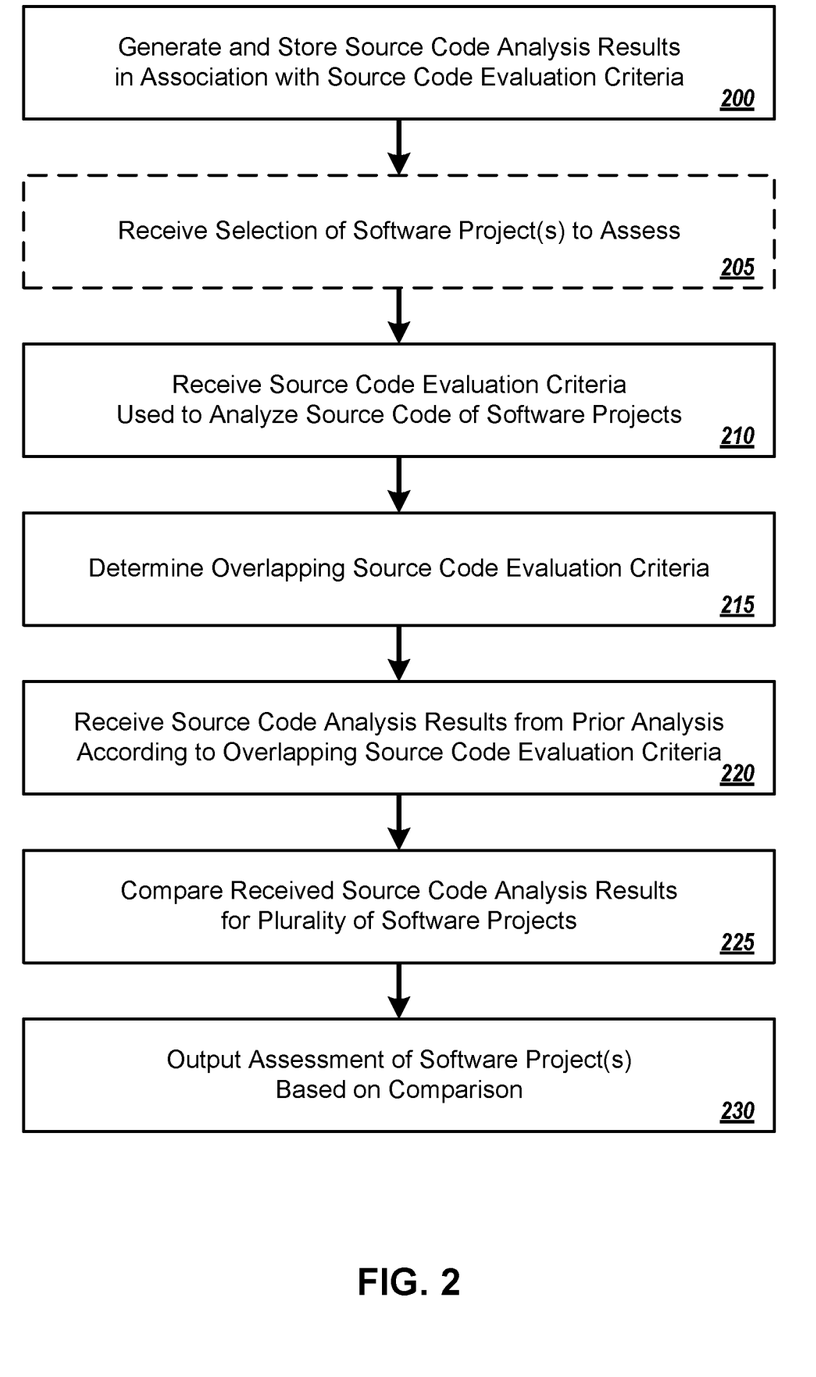
FIG. 2 is a flow chart of an example process for providing software project information based on overlapping source code evaluation criteria.

FIG. 2 is a flow chart of an example process for providing software project information based on overlapping source code evaluation criteria. The process will be described as being performed by an appropriately programmed system of one or more computers, e.g., the example static analysis system 102, shown in FIG. 1.

For each of a plurality of software projects, the system can generate source code analysis results based on analyzing the software project according to a corresponding set of source code evaluation criteria, and can store the generated source code analysis results in association with the corresponding set of source code evaluation criteria (200). In general, the system can use pre-generated and stored source code analysis results from source code analysis performed on different software projects, at different times, using different evaluation criteria. For example, the system 102 can receive a request to analyze the source code 110a of the code base 112a, can use the source code evaluation criteria 120a available at the time of the analysis, and can store the generated source code analysis results 142a with the results data 132, in association with the corresponding criteria 120a. To maintain an association, for example, each criterion can be associated with a unique identifier maintained with the criterion in the source code evaluation criteria data source 122, and with the corresponding results in the source code analysis results data 132. The source code analysis results can include a value of a characteristic metric for each source code evaluation criterion used when performing the analysis. Each criterion, e.g., query, used when performing the analysis, for example, can be directed to a different aspect of the source code, such as recognizing a particular type of violation.

After a period of time, e.g., a day, a week, a month, a year, the system can receive another request to analyze source code of a software project. During that period of time, for example, one or more criteria may be added to the source code evaluation criteria data source 122, and/or one or more criteria may be removed. For example, a new query may be developed and added to the source code evaluation criteria data source 122 to recognize a new type of source code violation, and/or an existing query may be removed. The system 102 can receive a request to analyze the source code 110b of the code base 112b, can use the source code evaluation criteria 120b available at the time of the analysis, and can store the generated source code analysis results 142b with the results data 132, in association with the corresponding criteria 120b. Thus, the criteria 120a used to analyze the source code 110a can be different from the criteria 120b used to analyze the source code 110b.

Optionally, the system receives a selection of one or more software projects to assess (205). For example, the system 102 can receive the request 104 for software project assessment(s) from the user device 100, e.g., by way of a selection provided using the interface 130. In some implementations, the request 104 can include a request to assess a plurality of software projects. For example, the request 104 can include a request to rank and/or rate software projects including the source code 110a, the source code 110b, and other previously analyzed source code. In some implementations, the request 104 can include a request to assess a single software project. For example, the request 104 can include a request to rank and/or rate a software project currently under development, relative to one or more previously analyzed software projects, e.g., previous versions of the software project and/or other software projects. In the present example, the request 104 includes a request to analyze a software project associated with the code base 112c and to provide an assessment, e.g. ranking and/or rating, of the software project relative to software projects associated with the respective code bases 112a and 112b. In response to the request 104, for example, the system 102 can receive the source code 110c from the code base 112c, and can use the analysis engine 140 to analyze the source code using the source code evaluation criteria 120c, e.g., different criteria from the criteria 120a and/or 120b. After performing the analysis, the source code analysis results 142c can be provided for storage with the results data 132, in association with the corresponding criteria 120c.

In some implementations, the system can receive a selection of one or more source code evaluation criteria categories to be used when assessing the one or more selected software projects. The source code evaluation criteria categories can include one or more of a security category, a readability category, an efficiency category, a concurrency category, or another suitable category of source code evaluation criteria. For example, each criterion, e.g., query, of the source code evaluation criteria data source 122 can be previously categorized as belonging to one or more source code evaluation criteria categories. The request 104 for software project assessment(s), for example, can include a request, e.g., generated by the interface 130 presented by the user device 100, to assess software project(s) in regard to all categories of source code evaluation criteria, or in regard to a subset of the categories. For example, the request 104 can include a request to assess a selected software project or a group of selected software projects with regard to security, readability, efficiency, concurrency, and/or all categories of evaluation criteria.

The system receives, for each of a plurality of software projects, a corresponding set of source code evaluation criteria that had been used to analyze source code of the respective software project (210) to identify characteristic segments of the source code. For example, the assessment engine 160 can receive the source code evaluation criteria 150, including the criteria 120a used to analyze the source code 110a, the criteria 120b used to analyze the source code 110b, and the criteria 110c used to analyze the source code 110c. As has been described, at least one set of source code evaluation criteria can be different from one or more other sets of source code evaluation criteria.

Figure 3:
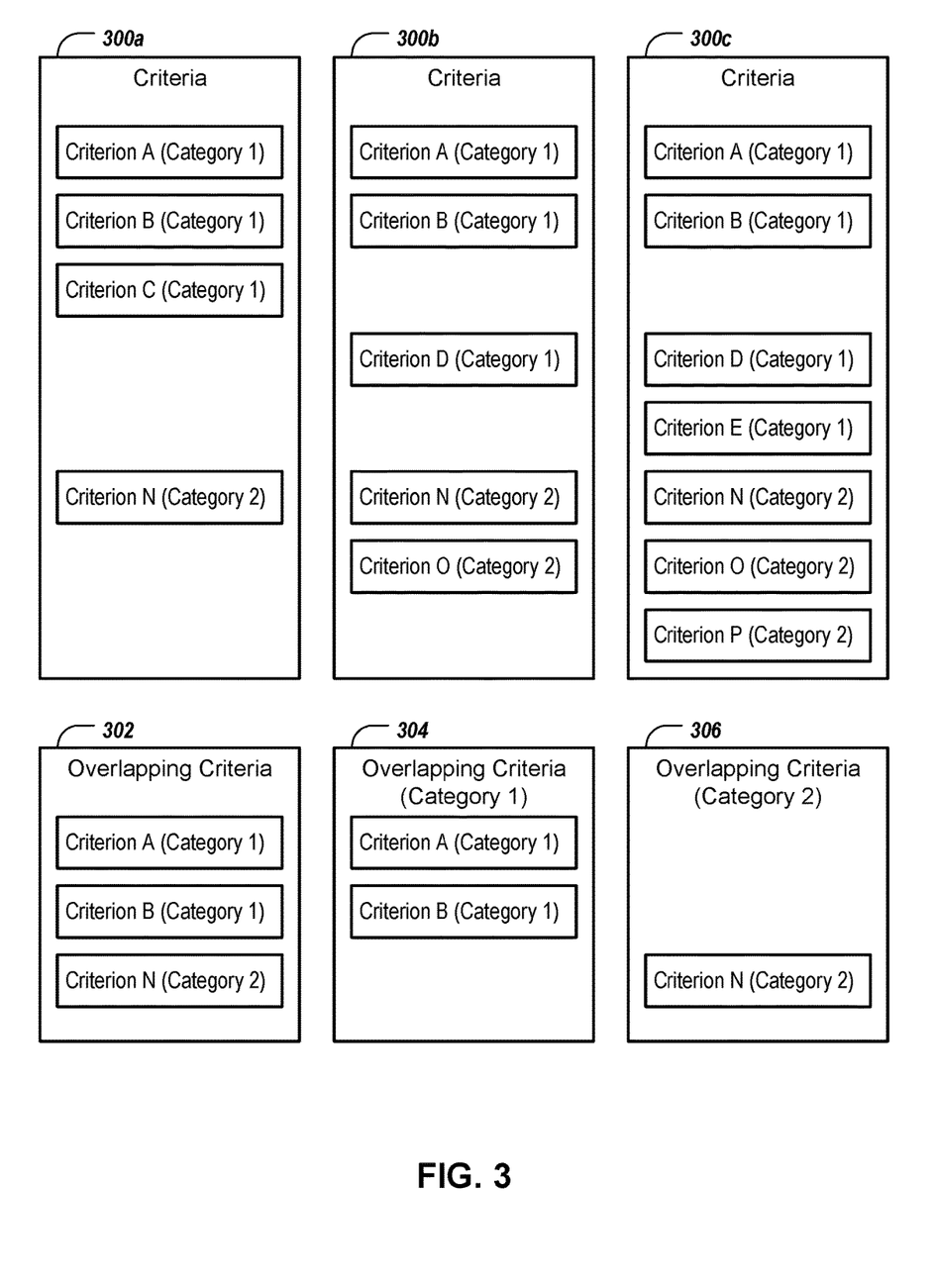
FIG. 3 illustrates example sets of source code evaluation criteria.

Referring now to FIG. 3, example sets of source code evaluation criteria are illustrated. The present example illustrates criteria 300a, e.g., corresponding to the criteria 120a (shown in FIG. 1), criteria 300b, e.g., corresponding to the criteria 120b (also shown in FIG. 1), and criteria 300c, e.g., corresponding to the criteria 120c (also shown in FIG. 1). As shown in the present example, the set of criteria 300a includes Criterion A, B, and C, each belonging to Category 1, and Criterion N, belonging to Category 2. The set of criteria 300b, for example, includes Criterion A, B, and D, each belonging to Category 1, and Criterion N and O, each belonging to Category 2. In the present example, Criterion C has been removed from the source code evaluation criteria data source 122 (shown in FIG. 1), and Criterion D and O have each been added, sometime between the times that source code 110a and source code 110b were analyzed. The set of criteria 300c, for example, includes Criterion A, B, D, and E, each belonging to Category 1, and Criterion N, O, and P, each belonging to Category 2. In the present example, Criterion E and P have each been added to the source code evaluation criteria data source 122, sometime between the times that source code 110b and source code 110c were analyzed.

The system determines an overlapping set of source code evaluation criteria (215). The overlapping set of source code evaluation criteria includes source code evaluation criteria that were included in each set of source code evaluation criteria that had been used to analyze source code of the respective software projects. Determining the overlapping set of source code evaluation criteria can be performed, for example, by associating each criterion, or query used to implement the criterion, with an identifier and comparing identifiers to identify criteria that had been included in each set of source code evaluation criteria. For example, the assessment engine 160 (shown in FIG. 1) can determine an overlapping set of source code evaluation criteria 302 that includes criteria that were included in each of the sets of source code evaluation criteria 300a, 300b, and 300c, and that excludes criteria that were excluded from one or more of the sets of criteria 300a, 300b, and 300c. In the present example, the overlapping set of source code evaluation criteria 302 includes Criterion A and B, each belonging to Category 1, and Criterion N, belonging to Category 2.

In some implementations, determining the overlapping set of source code evaluation criteria can include determining source code evaluation criteria that are associated with the one or more selected source code evaluation criteria categories. For example, the assessment engine 160 (shown in FIG. 1) can determine an overlapping set of source code evaluation criteria 304 that includes only criteria that is associated with Category 1, and an overlapping set of source code evaluation criteria 306 that includes only criteria that is associated with Category 2. In the present example, the overlapping set of source code evaluation criteria 304 includes Criterion A and B, and the overlapping set of source code evaluation criteria 306 includes Criterion N.

The system receives, for each of the plurality of software projects, source code analysis results that had resulted from prior analysis of the respective software project according to source code evaluation criteria included in the overlapping set of source code evaluation criteria (220). For example, the assessment engine 160 (shown in FIG. 1) can receive source code analysis results 152 (also shown in FIG. 1) that had resulted from prior analysis of the code bases 112a-c (also shown in FIG. 1), according to the overlapping set of source code evaluation criteria 302. For each criterion, e.g., query, in the set of criteria 302, for example, the assessment engine 160 can use a unique identifier associated with the criterion to access the source code analysis results data 132 (shown in FIG. 1), and can receive results 152 that pertain to that criterion. As another example, the assessment engine 160 can receive source code analysis results 152 that had resulted from prior analysis of the code bases 112a-c, according to the overlapping set of source code evaluation criteria 304 belonging to Category 1 and/or the overlapping set of source code evaluation criteria 306 belonging to Category 2.

The system compares the received source code analysis results for each of the plurality of software projects (225). Referring again to FIG. 1, for example, the assessment engine 160 can compare the source code analysis results 152, for each of the code bases 112a-c. For example, the source code analysis results 152 can include a number of violations that had been identified in each of the code bases 112a-c, for each criterion in an overlapping set of source code evaluation criteria, e.g., any of the overlapping sets of criteria 302, 304, or 306 (shown in FIG. 3). The results can be aggregated to determine an overall value of the characteristic metric for each software project, according to only the overlapping criteria that were used to analyze source code of all of the respective projects. Thus, software projects can be equitably compared, even though the projects had been analyzed at different times using different criteria.

The system outputs, for at least one of the plurality of software projects, an assessment of the software project based on comparing the received source code analysis results (230). For example, the assessment engine 160 can output assessment(s) 106, responsive to the request 104. In some implementations, outputting the assessment can include outputting an assessment of each of the selected one or more software projects. For example, the user device 100 can output the interface 130, which presents, for each of Software Projects A, B, and C, corresponding to the respective code bases 112a, 112b, and 112c, a respective assessment of the software project.

Figure 4:
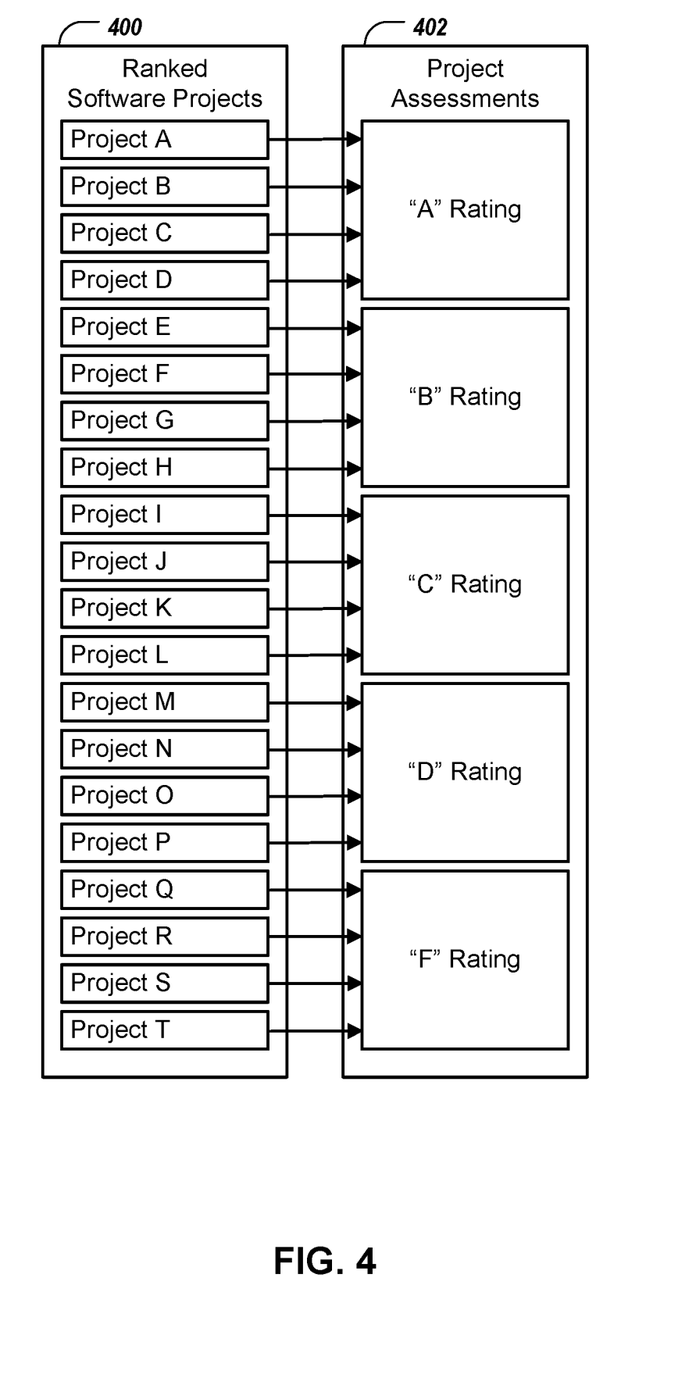
FIG. 4 illustrates example software project assessments.

In some implementations, outputting the assessment can include ranking the plurality of software projects based on the comparing, and outputting a rating of a given software project based a percentile rank of the given software project. Referring now to FIG. 4, example software project assessments are illustrated. The present example illustrates a list of ranked software projects 400 and corresponding project assessments 402. In the present example, the list of ranked software projects 400 includes a ranking of software projects, e.g., Project A Project T, in which the software projects are ranked in order according to violation density. For example, a software project that has a lower violation density can be ranked higher than a software project that has a higher violation density, and vice versa. After ranking the software projects, for example, each of the software projects can be rated according to its ranking. For example, a technique for rating a software project can include determining a percentile ranking for the project, and assigning the project to a rating designation according to its percentile ranking. In the present example, the top twenty percent of ranked software projects, e.g., Projects A-D are assigned an "A" rating, the next twenty percent of ranked software projects, e.g., Projects E-H, are assigned a "B" rating, the next twenty percent of ranked projects, e.g., Projects I-L, are assigned a "C" rating, the next twenty percent of ranked projects, e.g., Projects M-P, are assigned a "D" rating, and the bottom twenty percent of ranked projects, e.g., Projects Q-T, are assigned an "F" rating. In other examples, other rating techniques can be used, such as including a different number of percentile ranges, e.g., 3, 6, 10, etc., different sorts of ratings designations, e.g., a numeric designation such as 1-10, a text designation such as Excellent/Good/Average/Fair/Poor, or another suitable rating technique.

In some implementations, outputting the assessment can include outputting, for each of the plurality of software projects, a category rating for each of the one or more selected source code evaluation criteria categories. For example, each of the previously analyzed software projects, e.g., Project A Project T, can be ranked according to overlapping sets of source code evaluation criteria for each of one or more different categories, and can be assigned a rating designation that corresponds to a percentile rank of the project according to the category. A given software project, for example, can be assigned an "A" rating for security violations, a "B" rating for readability violations, a "C" rating for efficiency violations, and a "C" rating for concurrency violations, relative to other previously analyzed software projects, instead of or in addition to an overall "B" rating. Software developers can use such assessment information, e.g., rankings and/or ratings, to identify software projects to focus on, and to identify particular areas for improvement.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an AS IC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving, for each of a plurality of software projects, a respective set of source code evaluation criteria that had been used to analyze source code of the respective software project, wherein at least one set of source code evaluation criteria is different from one or more other sets of source code evaluation criteria;

determining an overlapping set of source code evaluation criteria, the overlapping set of source code evaluation criteria including source code evaluation criteria that were included in each set of source code evaluation criteria;

determining, for each of the plurality of software projects, which source code analysis results resulted from the overlapping set of source code evaluation criteria;

computing, for each of the plurality of software projects, a respective value of a characteristic metric for the source code analysis results that resulted from the overlapping set of source code evaluation criteria;

comparing the respective values of the characteristic metric for each of the plurality of software projects; and outputting, for at least one of the plurality of software projects, an assessment of the software project based on the comparison of the respective values of the characteristic metric.

Embodiment 2 is the method of embodiment 1, further comprising:
for each of the plurality of software projects:
generating source code analysis results based on analyzing the software project according to the corresponding set of source code evaluation criteria; and
storing the generated source code analysis results in association with the corresponding set of source code evaluation criteria.

Embodiment 3 is the method of any one of embodiments 1-2, further comprising receiving a selection of one or more software projects to be assessed, wherein outputting the assessment comprises outputting an assessment of each of the selected one or more software projects.

Embodiment 4 is the method of any one of embodiments 1-3, further comprising receiving a selection of one or more source code evaluation criteria categories, wherein determining the overlapping set of source code evaluation criteria includes determining source code evaluation criteria that are associated with the one or more selected source code evaluation criteria categories.

Embodiment 5 is the method of embodiment 4, wherein outputting the assessment includes outputting, for each of the plurality of software projects, a category rating for each of the one or more selected source code evaluation criteria categories Embodiment 6 is the method of any one of embodiments 4-5, wherein the one or more source code evaluation criteria categories includes one or more of a security category, a readability category, an efficiency category, or a concurrency category.

Embodiment 7 is the method of any one of embodiments 1-6, wherein determining the overlapping set of source code evaluation criteria includes associating each source code evaluation criterion with an identifier and comparing identifiers to identify source code evaluation criteria that were included in each set of source code evaluation criteria.

Embodiment 8 is the method of any one of embodiments 1-7, wherein outputting the assessment comprises ranking the plurality of software projects based on the comparing, and outputting a rating of a given software project based on a percentile rank of the given software project.

Embodiment 9 is the method of any one of embodiments 1-8, wherein the source code analysis results include one or more of a total number of violations and a violation density for at least one source code evaluation criterion.

Embodiment 10 is the method of any one of embodiments 1-9, wherein the source code analysis results include one or more of a total number of violations and a net number of violations introduced over a particular time period.

Embodiment 11 is a system comprising: one or more computers and one or more storage devices storing instructions that are operable, when executed by the one or more computers, to cause the one or more computers to perform the method of any one of embodiments 1-10.

Embodiment 12 is a computer storage medium encoded with a computer program, the program comprising instructions that are operable, when executed by data processing apparatus, to cause the data processing apparatus to perform the method of any one of embodiments 1-10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:
1. A computer-implemented method for ranking software projects according to a violation metric computed over violations identified by respective static analysis processes using different sets of violation rules over different respective time periods without reanalyzing the software projects, the method comprising:
performing a first static analysis process on a first software project during a first time period, including:
performing a first build process for the first software project and extracting source code of the first software project by intercepting calls to compilers invoked during the first build process, and
using a first set of violation rules to identify violations occurring in extracted source code belonging to respective snapshots of the first software project;
storing first static analysis result data representing the violations identified in the respective snapshots of the first software project by the first static analysis process;
receiving one or more updated violation rules and adding the one or more updated violation rules to the first set of violation rules to generate an updated set of violation rules;
performing a second static analysis process on a different second software project during a second time period subsequent to the first time period, including:
performing a second build process for the second software project and extracting source code of the second software project by intercepting calls to compilers invoked during the second build process, and using the updated set of violation rules to identify violations occurring in extracted source code belonging to respective snapshots of the second software project;

storing second static analysis result data representing the violations identified in the respective snapshots of the second software project by the second static analysis process;

during a third time period subsequent to the second time period, ranking a plurality of software projects including the first software project and the second software project using respective static analysis result data previously generated for each software project including using the first static analysis result data for the first software project and the second static analysis result data for the second software project without reanalyzing any of the plurality of software projects, including:

receiving a request that identifies the plurality of software projects to be ranked according to a violation metric that is representative of the respective prevalence of violations occurring in each software project, wherein each software project of the plurality of software projects is a software project for which respective violations were previously identified by a static analysis process according to a respective set of violation rules;

receiving respective static analysis result data generated before the request was received, the static analysis result data representing respective violations identified as occurring in each of the plurality of software projects by the static analysis process using a respective violation rule to identify violations of a particular type among a plurality of different types of violations;

obtaining, for each software project of the plurality of software projects, a respective set of violation rules that the static analysis process used to identify violations occurring in the software project;

computing a set of overlapping violation rules for the plurality of software projects identified by the request, the set of overlapping violation rules comprising one or more violation rules that the static analysis process evaluated against each software project of the plurality of software projects identified by the request;

classifying each violation occurring in the plurality of software projects as being either (i) a violation that was identified by the static analysis process by evaluating a nonoverlapping violation rule that does not occur in the set of overlapping violation rules, or (ii) a violation that was identified by the static analysis process by evaluating an overlapping violation rule that occurs in the set of overlapping violation rules;

computing, for each software project of the plurality of software projects, a respective updated value of the violation metric by using only violations classified as being identified by overlapping violation rules for the plurality of software projects identified by the request; and ranking the plurality of software projects according to the respective updated values of the violation metric computed using only violations identified by overlapping violation rules.

2. The method of claim 1, further comprising:
computing an updated value of the violation metric for the first software project by using violations identified according to the set of overlapping violation rules instead of the first set of violation rules used by the first static analysis process when the first software project was analyzed.

3. The method of claim 1, wherein computing, for each software project of the plurality of software projects, a respective updated value of the violation metric comprises computing the respected updated value by disregarding violations identified from nonoverlapping violation rules.

4. The method of claim 1, wherein computing, for each software project of the plurality of software projects, a respective updated value of the violation metric comprises computing the respected updated value without identifying any new violations in the software project.

5. The method of claim 1, wherein the violation metric is specific to a particular violation rule category of a plurality of violation rule categories, and further comprising providing, for each of the plurality of software projects, a respective category rating for the particular violation rule category.

6. The method of claim 5, wherein the plurality of violation rule categories include one or more of a security category, a readability category, an efficiency category, or a concurrency category.

7. The method of claim 1, wherein each of the plurality of software projects was analyzed using a different respective set of violation rules.

8. The method of claim 1, further comprising:
partitioning the computed updated values of the violation metric for the overlapping violation rules into a plurality of percentile ranges; and
computing a respective rating of each software project based on a percentile range into which the software project falls according to the respective updated value of the violation metric computed using the overlapping violation rules.

9. The method of claim 1, wherein the violation metric is a total number of violations or a violation density.

10. The method of claim 1, wherein the violation metric is a net number of violations introduced over a particular time period.

11. A system comprising:
one or more computers and one or more storage devices storing instructions that are operable, when executed by the one or more computers, to cause the one or more computers to perform operations for ranking software projects according to a violation metric identified by respective static analysis processes using different sets of violation rules over different respective time periods without reanalyzing the software projects, the operations comprising:

performing a first static analysis process on a first software project during a first time period, including:
performing a first build process for the first software project and extracting source code of the first software project by intercepting calls to compilers invoked during the first build process, and
using a first set of violation rules to identify violations occurring in extracted source code belonging to respective snapshots of the first software project;

storing first static analysis result data representing the violations identified in the respective snapshots of the first software project by the first static analysis process;

receiving one or more updated violation rules and adding the one or more updated violation rules to the first set of violation rules to generate an updated set of violation rules;

performing a second static analysis process on a different second software project during a second time period subsequent to the first time period, including:
  performing a second build process for the second software project and extracting source code of the second software project by intercepting calls to compilers invoked during the second build process, and
  using the updated set of violation rules to identify violations occurring in extracted source code belonging to respective snapshots of the second software project;
storing second static analysis result data representing the violations identified in the respective snapshots of the second software project by the second static analysis process;
during a third time period subsequent to the second time period, ranking a plurality of software projects including the first software project and the second software project using respective static analysis result data previously generated for each software project including using the first static analysis result data for the first software project and the second static analysis result data for the second software project without reanalyzing any of the plurality of software projects, including:
  receiving a request that identifies the plurality of software projects to be ranked according to a violation metric that is representative of the respective prevalence of violations occurring in each software project, wherein each software project of the plurality of software projects is a software project for which respective violations were previously identified by a static analysis process according to a respective set of violation rules;
  receiving respective static analysis result data generated before the request was received, the static analysis result data representing respective violations identified as occurring in each of the plurality of software projects by the static analysis process using a respective violation rule to identify violations of a particular type among a plurality of different types of violations;
  obtaining, for each software project of the plurality of software projects, a respective set of violation rules that the static analysis process used to identify violations occurring in the software project;
  computing a set of overlapping violation rules for the plurality of software projects identified by the request, the set of overlapping violation rules comprising one or more violation rules that the static analysis process evaluated against each software project of the plurality of software projects identified by the request;
  classifying each violation occurring in the plurality of software projects as being either (i) a violation that was identified by the static analysis process by evaluating a nonoverlapping violation rule that does not occur in the set of overlapping violation rules, or (ii) a violation that was identified by the static analysis process by evaluating an overlapping violation rule that occurs in the set of overlapping violation rules;
  computing, for each software project of the plurality of software projects, a respective updated value of the violation metric by using only violations classified as being identified by overlapping violation rules for the plurality of software projects identified by the request; and
  ranking the plurality of software projects according to the respective updated values of the violation metric computed using only violations identified by overlapping violation rules.

12. The system of claim 11, wherein the operations further comprise:
  computing an updated value of the violation metric for the first software project by using violations identified according to the set of overlapping violation rules instead of the first set of violation rules used by the first static analysis process when the first software project was analyzed.

13. The system of claim 11, wherein computing, for each software project of the plurality of software projects, a respective updated value of the violation metric comprises computing the respected updated value by disregarding violations identified from nonoverlapping violation rules.

14. The system of claim 11, wherein computing, for each software project of the plurality of software projects, a respective updated value of the violation metric comprises computing the respected updated value without identifying any new violations in the software project.

15. The system of claim 11, wherein the violation metric is specific to a particular violation rule category of a plurality of violation rule categories, and wherein the operations further comprise providing, for each of the plurality of software projects, a respective category rating for the particular violation rule category.

16. A computer program product, encoded on one or more non-transitory computer storage media, comprising instructions that when executed by one or more computers cause the one or more computers to perform operations for ranking software projects according to a violation metric identified by respective static analysis processes using different sets of violation rules over different respective time periods without reanalyzing the software projects, the operations comprising:
  performing a first static analysis process on a first software project during a first time period, including:
    performing a first build process for the first software project and extracting source code of the first software project by intercepting calls to compilers invoked during the first build process, and
    using a first set of violation rules to identify violations occurring in extracted source code belonging to respective snapshots of the first software project;
  storing first static analysis result data representing the violations identified in the respective snapshots of the first software project by the first static analysis process;
  receiving one or more updated violation rules and adding the one or more updated violation rules to the first set of violation rules to generate an updated set of violation rules;
  performing a second static analysis process on a different second software project during a second time period subsequent to the first time period, including:
    performing a second build process for the second software project and extracting source code of the second software project by intercepting calls to compilers invoked during the second build process, and
    using the updated set of violation rules to identify violations occurring in extracted source code belonging to respective snapshots of the second software project;

storing second static analysis result data representing the violations identified in the respective snapshots of the second software project by the second static analysis process;

during a third time period subsequent to the second time period, ranking a plurality of software projects including the first software project and the second software project using respective static analysis result data previously generated for each software project including using the first static analysis result data for the first software project and the second static analysis result data for the second software project without reanalyzing any of the plurality of software projects, including:

receiving a request that identifies the plurality of software projects to be ranked according to a violation metric that is representative of the respective prevalence of violations occurring in each software project, wherein each software project of the plurality of software projects is a software project for which respective violations were previously identified by a static analysis process according to a respective set of violation rules;

receiving respective static analysis result data generated before the request was received, the static analysis result data representing respective violations identified as occurring in each of the plurality of software projects by the static analysis process using a respective violation rule to identify violations of a particular type among a plurality of different types of violations;

obtaining, for each software project of the plurality of software projects, a respective set of violation rules that the static analysis process used to identify violations occurring in the software project;

computing a set of overlapping violation rules for the plurality of software projects identified by the request, the set of overlapping violation rules comprising one or more violation rules that the static analysis process evaluated against each software project of the plurality of software projects identified by the request;

classifying each violation occurring in the plurality of software projects as being either (i) a violation that was identified by the static analysis process by evaluating a nonoverlapping violation rule that does not occur in the set of overlapping violation rules, or (ii) a violation that was identified by the static analysis process by evaluating an overlapping violation rule that occurs in the set of overlapping violation rules;

computing, for each software project of the plurality of software projects, a respective updated value of the violation metric by using only violations classified as being identified by overlapping violation rules for the plurality of software projects identified by the request; and ranking the plurality of software projects according to the respective updated values of the violation metric computed using only violations identified by overlapping violation rules.

17. The computer program product of claim 16, wherein the operations further comprise:

computing an updated value of the violation metric for the first software project by using violations identified according to the set of overlapping violation rules instead of the first set of violation rules used by the first static analysis process when the first software project was analyzed.

18. The computer program product of claim 16, wherein computing, for each software project of the plurality of software projects, a respective updated value of the violation metric comprises computing the respected updated value by disregarding violations identified from nonoverlapping violation rules.

19. The computer program product of claim 16, wherein computing, for each software project of the plurality of software projects, a respective updated value of the violation metric comprises computing the respected updated value without identifying any new violations in the software project.

20. The computer program product of claim 16, wherein the violation metric is specific to a particular violation rule category of a plurality of violation rule categories, and wherein the operations further comprise providing, for each of the plurality of software projects, a respective category rating for the particular violation rule category.

* * * * *